(12) United States Patent
Kim

(10) Patent No.: US 8,243,034 B2
(45) Date of Patent: Aug. 14, 2012

(54) ORGANIC LIGHT EMITTING DISPLAY DEVICE

(75) Inventor: Eun-Ah Kim, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 434 days.

(21) Appl. No.: 12/506,162

(22) Filed: Jul. 20, 2009

(65) Prior Publication Data
US 2010/0123672 A1    May 20, 2010

(30) Foreign Application Priority Data
Nov. 14, 2008    (KR) .................. 10-2008-0113345

(51) Int. Cl.
*G06F 3/041* (2006.01)
(52) U.S. Cl. .......................................... 345/173; 345/82
(58) Field of Classification Search .................. 345/156, 345/173–175, 82; 445/24
See application file for complete search history.

(56) References Cited

U.S. PATENT DOCUMENTS

| | | | |
|---|---|---|---|
| 7,456,922 B2 * | 11/2008 | Eguchi | 349/138 |
| 2006/0146207 A1 | 7/2006 | Cho et al. | |
| 2008/0170028 A1 * | 7/2008 | Yoshida | 345/100 |
| 2008/0284929 A1 * | 11/2008 | Kimura | 349/38 |

FOREIGN PATENT DOCUMENTS

| | | |
|---|---|---|
| KR | 10-2004-0017138 A | 2/2004 |
| KR | 10-2008-0073559 A | 8/2008 |

OTHER PUBLICATIONS

KIPO Office action dated Dec. 30, 2010 in priority Korean application No. KR 10-2008-0113345, 3 pps.

* cited by examiner

*Primary Examiner* — Ricardo L Osorio
(74) *Attorney, Agent, or Firm* — Christie, Parker & Hale, LLP

(57) ABSTRACT

An organic light emitting display device includes: a substrate; an organic light emitting unit on the substrate; a sealing substrate sealing the organic light emitting unit; and a touch panel on the sealing substrate, and configured for polarizing light, wherein the touch panel includes a first film on the sealing substrate and a second film spaced from the first film and on the first resistive layer.

15 Claims, 3 Drawing Sheets

ORGANIC LIGHT EMITTING DISPLAY DEVICE

CROSS-REFERENCE TO RELATED PATENT APPLICATION

This application claims priority to and the benefit of Korean Patent Application No. 10-2008-0113345, filed on Nov. 14, 2008, in the Korean Intellectual Property Office, the entire content of which is incorporated herein by reference.

BACKGROUND OF THE INVENTION

1. Field of the Invention

The present invention relates to an organic light emitting display device.

2. Description of the Related Art

Electroluminescence display devices, which are flat panel display devices, are self-emissive display devices with a wide viewing angle, good contrast, and fast response time. Organic light emitting display devices including a light emission layer formed of an organic material have improved brightness, driving voltage, response time characteristics and multi-colorization characteristics, as compared to inorganic light emitting display devices.

Recently, research for applying a touch panel function to organic electroluminescent display devices has been conducted. The research is directed to improve user convenience by installing a touch panel function in a display, wherein the touch panel function is performed by inputting commands on a screen of the display with a user's finger or a pen type instrument.

A touch panel can be a resistive film type touch panel or a capacitive type touch panel, according to its operational principle. In the resistive film type touch panel, when a voltage is applied between two opposing conductive layers, a user presses a screen to make the two conductive layers come into contact with each other. A voltage or current variation generated at the contact point is then detected to read a coordinate value of the contact point.

In the capacitive type touch panel, while capacitance charging or discharging iteratively keeps taking place on a transparent conductive film or a transparent conductive glass, a small quantity of electric charges is accumulated between the conductive film and a stylus used as a pen type input instrument. The electric charge quantity is detected from four input points which are converted into a coordinate value.

To install a touch panel function in organic light emitting display devices, a touch panel is disposed on an organic light emitting display panel, thereby increasing the thickness of the organic light emitting display device. Also, the organic light emitting display device generally includes a polarizing plate in order to prevent or reduce reflection of external light, and thus the organic light emitting display device becomes thicker due to the polarizing plate and the touch panel included therein.

SUMMARY OF THE INVENTION

According to embodiments of the present invention, an organic light emitting display device is made thinner by including a touch panel having a polarizing function.

An embodiment of the present invention provides an organic light emitting display device including: a substrate; an organic light emitting unit on the substrate; a sealing substrate sealing the organic light emitting unit; and a touch panel on the sealing substrate, and configured for polarizing light, wherein the touch panel includes a first film on the sealing substrate and a second film spaced from the first film and on the first resistive layer.

The first film may include a first transparent conductive layer, and the second film may include a polarizing plate spaced from the first film and a second transparent conductive layer on a side of the polarizing plate facing the first film.

The first transparent conductive layer and the second transparent conductive layer include indium tin oxide (ITO).

The polarizing plate may include a retardation film, an adhesive layer, and a linear polarizer, which are sequentially stacked on the second transparent conductive layer.

The first transparent conductive layer and the sealing substrate may form a lower resistive layer of the touch panel, and the second film may form an upper resistive layer of the touch panel.

The first film may include a transparent insulating layer and a third transparent conductive layer, which are stacked on the sealing substrate, and the second film may include a polarizing plate, spaced from the third transparent conductive layer, and a fourth transparent conductive layer on a side of the polarizing plate facing the first film.

The third transparent conductive layer and the fourth transparent conductive layer may include indium tin oxide (ITO).

The polarizing plate may include a retardation film, an adhesive layer, and a linear polarizer, which are stacked on the fourth transparent conductive layer.

The third transparent conductive layer and the transparent insulating layer may form a lower resistive layer of the touch panel, and the fourth transparent conductive layer and the polarizing plate may form an upper resistive layer of the touch panel.

The first film may include a first polarizer and a fifth transparent conductive layer which are sequentially stacked on the sealing substrate, and the second film may include a second polarizer, spaced from the fifth transparent conductive layer, and a sixth transparent conductive layer on a side of the second polarizer facing the first film.

The fifth transparent conductive layer and the sixth transparent conductive layer may include indium tin oxide ITO.

The first polarizer may include a retardation film, and the second polarizer may include a linear polarizer.

The fifth transparent conductive layer and the first polarizer may form a lower resistive layer of the touch panel, and the sixth transparent conductive layer and the second polarizer may form an upper resistive layer of the touch panel.

The organic light emitting display device may further include a plurality of spacers maintaining an interval between the first film and the second film.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE INVENTION

Figure 1:
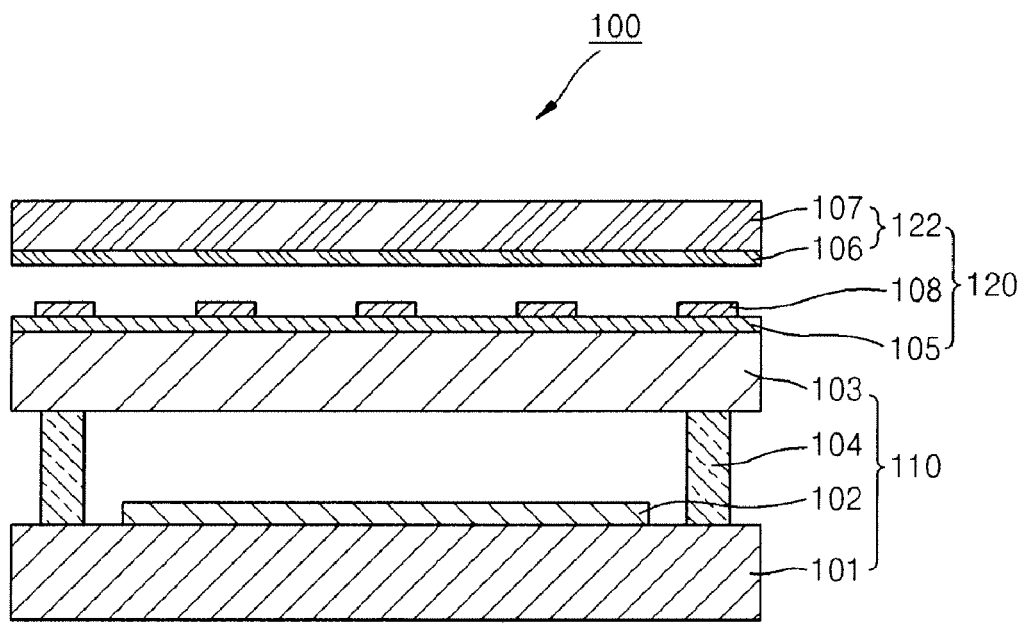
FIG. 1 is a schematic cross-sectional view of an organic light emitting display device according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In the drawings, the thicknesses of layers and regions are exaggerated for clarity. Like reference numerals in the drawings denote like elements.

FIG. 1 is a schematic cross-sectional view of an organic light emitting display device 100 according to an embodiment of the present invention.

Referring to FIG. 1, the organic light emitting display device 100 includes an organic light emitting display panel 110 and a touch panel 120. The organic light emitting display panel 110 includes a substrate 101, an organic light emitting unit 102, and a sealing substrate 103. The substrate 101 may be formed of transparent glass, plastic sheeting, silicon, or the like, and may be formed of a flexible or inflexible material or a transparent or opaque material. Also, the substrate 101 may be a metal substrate.

The organic light emitting unit 102 may be formed on the substrate 101 and include a plurality of organic electroluminescent devices. Each organic electroluminescent device includes a pixel electrode, a counter electrode opposite to the pixel electrode, and an intermediate layer interposed between the pixel electrode and the counter electrode and including at least a light emission layer. The pixel electrode may be a transparent electrode or a reflective electrode. When the pixel electrode is a transparent electrode, the pixel electrode may be formed of ITO, IZO, ZnO or $In_2O_3$. When the pixel electrode is a reflective electrode, the pixel electrode may include a reflective film, formed of Ag, Mg, Al, Pt, Pd, Au, Ni, Nd, Ir, Cr or a combination thereof, and a film formed of ITO, IZO, ZnO or $In_2O_3$ on the reflective film. Also, the counter electrode may be a transparent electrode or a reflective electrode. When the counter electrode is a transparent electrode, the counter electrode may include a film, formed of Li, Ca, LiF/Ca, LiF/Al, Al, Mg or a combination thereof and deposited to face the intermediate layer interposed between the pixel electrode and the counter electrode, and an auxiliary electrode or bus electrode line formed on the film and formed of a material used to form the transparent electrode, such as ITO, IZO, ZnO or $In_2O_3$, or the like. When the counter electrode is a reflective electrode, the counter electrode may be formed of Li, Ca, LiF/Ca, LiF/Al, Al, Mg or a combination thereof. The intermediate layer may be formed of a low molecular organic material or a high molecular organic material. When the intermediate layer is formed of a low molecular organic material, the intermediate layer may be formed by stacking a hole injection layer (HIL), a hole transport layer (HTL), an emission layer (EML), an electron transport layer (ETL), and an electron injection layer (EIL), each having a single or multi-layered structure. These layers may be formed of a material such as copper phthalocyanine (CuPc), N,N'-Di(naphthalene-1-yl)-N,N'-diphenyl-benzidine (NPB), tris-8-hydroxyquinoline aluminum, or the like. The low molecular organic material may be formed by performing vacuum evaporation using masks. When the intermediate layer is formed of a high molecular organic material, the intermediate layer may be generally formed by stacking a HTL and an EML. The HTL may be formed of Poly(3,4-ethylenedioxythiophene) (PEDOT), and the EML may be formed of poly-phenylenevinylene (PPV)-based and polyfluorene-based high molecular organic materials.

The sealing substrate 103 is disposed above the organic light emitting unit 102 attached to the substrate 101. The sealing substrate 103 may be spaced apart from the organic light emitting unit 102 as illustrated in FIG. 1 and may be attached to the substrate 101 via an adhesive member 104. The sealing substrate 103 may be formed of glass or plastic, such as acryl. In a front emission type organic light emitting display device, the sealing substrate 103 may be formed of an electrically insulating material having high permeability with respect to light generated from the organic light emitting unit 102. For example, the electrically insulating material may be transparent glass, such as an alkali glass or non-alkali glass, or transparent ceramic, such as polyethylene terephthalate, polycarbonate, polyethersulfone, PVF, poly acrylate, zirconia, or quartz.

A touch panel 120 in the embodiment illustrated in FIG. 1 is disposed above the organic light emitting display panel 110, and includes a first film 105, a plurality of spacers 108, and a second film 122.

The spacers 108 are disposed on the first film 105 so as to prevent the first film 105 from coming in contact with the second film 122.

The first film 105 (hereinafter, referred to as the first transparent conductive layer 105) may be disposed on the sealing substrate 103 and formed of a first transparent conductive layer. The first transparent conductive layer 105 may be formed of a transparent conductive material, for example, indium tin oxide (ITO).

The second film 122 in the embodiment illustrated in FIG. 1 is spaced apart from the first transparent conductive layer 105 and includes a second transparent conductive layer 106 and a polarizing plate 107.

The second transparent conductive layer 106 and the first transparent conductive layer 105 are disposed opposite to each other, and the spacers 108 prevent the first transparent conductive layer 105 from coming in contact with the second transparent conductive layer 106. The second transparent conductive layer 106 may be formed of a transparent conductive material, for example, ITO, similar to the first transparent conductive layer 105.

Figure 2:
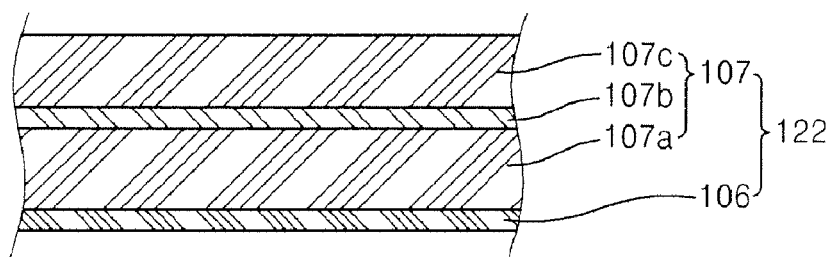
FIG. 2 is a schematic cross-sectional view of a second film of the organic light emitting display device of FIG. 1.

FIG. 2 is a schematic cross-sectional view of the second film 122 of FIG. 1. Referring to FIG. 2, the polarizing plate 107 may include a retardation film 107a, an adhesive layer 107b, and a linear polarizer 107c, which are sequentially stacked on the second transparent conductive layer 106. Only single axis directional light from among light incident from the outside is transmitted by the linear polarizer 107c, and a phase of the single axis directional light is delayed by the retardation film 107a and the light is reflected by the organic light emitting display panel 110. The phase of the reflected light has been delayed, and thus cannot be transmitted by the linear polarizer 107c. Accordingly, the second film 122 may function as a polarizing plate and decrease reflection of external light.

In the resistance film type touch panel, when a voltage is applied between opposing upper and lower resistive layers, a user presses the resistive layers to make the two resistive layers come into contact with each other. A voltage or current variation generated at the contact point is then detected to read a coordinate value of the contact point. In general, a resistive layer has a structure in which a transparent insulating layer and a conductive layer are stacked. In the organic light emitting display device 100 of FIG. 1, both the sealing substrate 103 and the first transparent conductive layer 105 function as a lower resistive layer, and the second film 122, including the second transparent conductive layer 106 and the polarizing plate 107, functions as an upper resistive layer. As such, in the embodiment of the present invention illustrated in FIG. 1, since the lower resistive layer includes the sealing substrate 103 and the first transparent conductive layer 105, the thickness of the touch panel 120 is decreased. That is, in the embodiment of the present invention illustrated in FIG. 1, since the first transparent conductive layer 105 formed on the sealing substrate 103 functions as a lower resistive layer without using an additional transparent insulating layer, the thickness of the touch panel 120 is decreased, thereby decreasing the entire thickness of the organic light emitting display device 100.

Also, in the embodiment of the present invention illustrated in FIG. 1, since the second film 122 functioning as an upper resistive layer includes the polarizing plate 107, the touch panel 120 has a polarizing function. Accordingly, since there is no need to include an additional polarizing film, the thickness of the organic light emitting display device 100 may be decreased.

Figure 3:
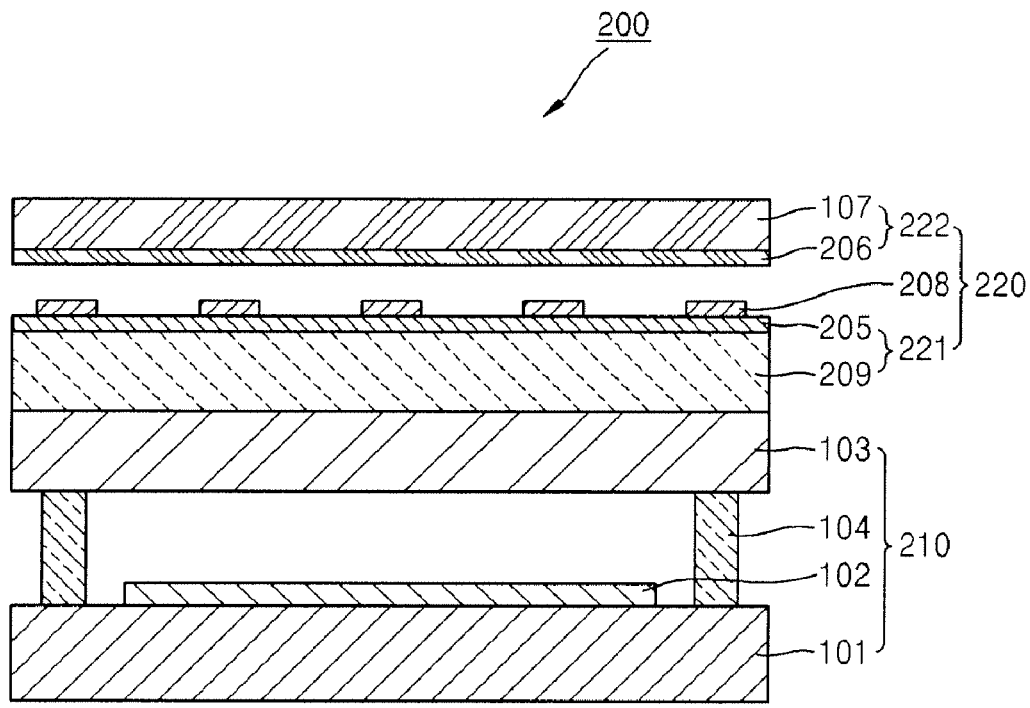
FIG. 3 is a schematic cross-sectional view of an organic light emitting display device according to another embodiment of the present invention.
Figure 4:
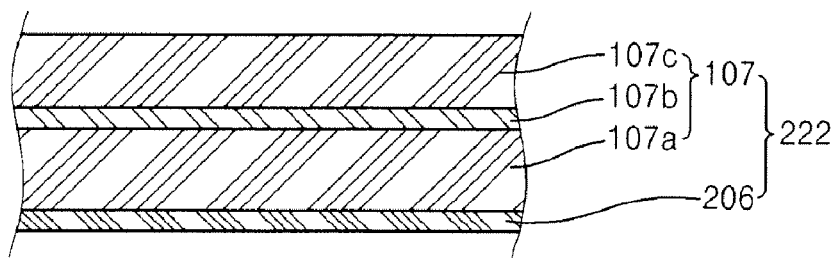
FIG. 4 is a schematic cross-sectional view of a second film of the organic light emitting display device of FIG. 3.

FIG. 3 is a schematic cross-sectional view of an organic light emitting display device 200 according to another embodiment of the present invention. FIG. 4 is a schematic cross-sectional view of a second film 222 of FIG. 3.

Referring to FIG. 3, the organic light emitting display device 200, according to another embodiment of the present invention, includes an organic light emitting display panel 210 and a touch panel 220.

The organic light emitting display panel 210 includes a substrate 101, an organic light emitting unit 102 disposed on the substrate 101, a sealing substrate 103 sealing the organic light emitting unit 102, and an adhesive member 104 attached to both the substrate 101 and the sealing substrate 103.

The touch panel 220 includes a first film 221, a second film 222, and spacers 208. The first film 221 is disposed on the sealing substrate 103 and includes a transparent insulating layer 209 and a third transparent conductive layer 205.

The spacers 208 are disposed on the first film 221 so as to prevent the first film 221 from coming in contact with the second film 222.

The second film 222 includes a fourth transparent conductive layer 206 and a polarizing plate 107. The third and fourth transparent conductive layers 205 and 206 may be formed of a transparent material such as ITO.

Referring to FIG. 4, the second film 222 includes the fourth transparent conductive layer 206 and the polarizing plate 107, including a retardation film 107a, an adhesive layer 107b, and a linear polarizer 107c, which are sequentially stacked on the fourth transparent conductive layer 206.

The first film 221 functions as a lower resistive layer of the touch panel 220, and the second film 222 functions as an upper resistive layer of the touch panel 220. The embodiment of the present invention illustrated in FIG. 3 differs from the embodiment of the present invention illustrated in FIG. 1 in that the first film 221 functions as a lower resistive layer and includes the transparent insulating layer 209 and the third transparent conductive layer 205 (in the embodiment of the present invention illustrated in FIG. 1, the sealing substrate 103 and the first transparent conductive layer 105 function as a lower resistive layer). Since the organic light emitting display device 200 does not need to include an additional polarizing plate since the second film 222 of the touch panel 220 has a polarizing function, the thickness of the organic light emitting display device 200 may be reduced.

The transparent insulating layer 209 may be formed of a polyethylene terephthalate film, a polycarbonate film, a cyclic olefin copolymer film or a triacetyl cellulose film.

Figure 5:
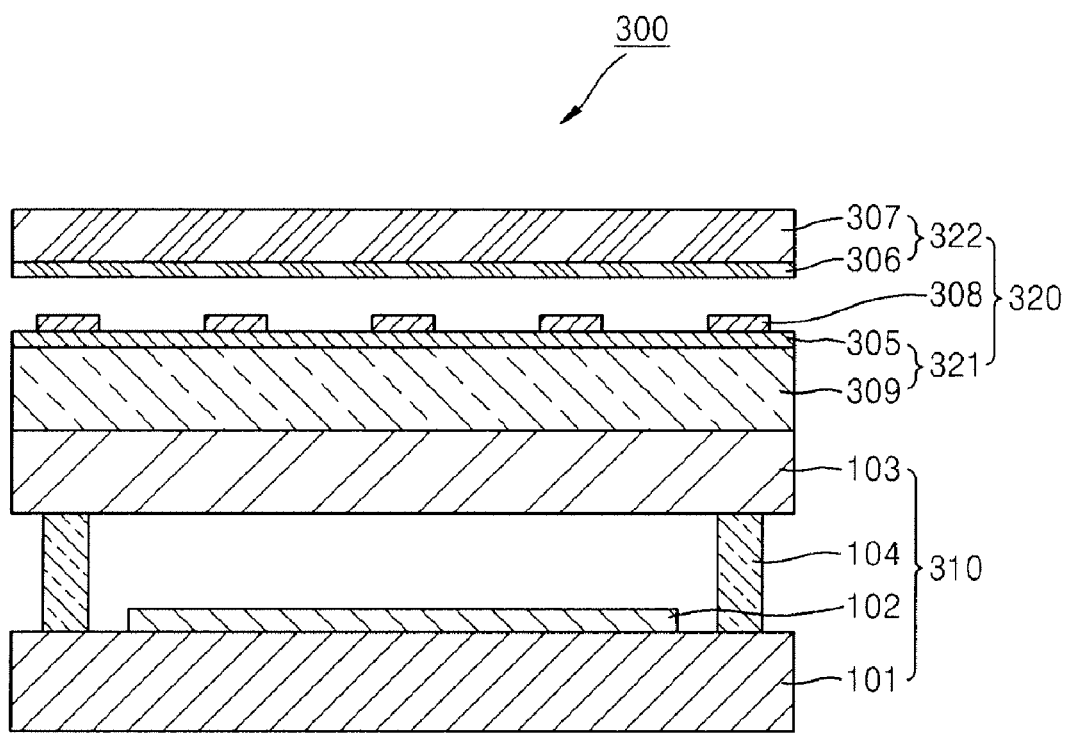
FIG. 5 is a schematic cross-sectional view of an organic light emitting display device according to another embodiment of the present invention.

FIG. 5 is a schematic cross-sectional view of an organic light emitting display device 300 according to another embodiment of the present invention.

Referring to FIG. 5, the organic light emitting display device 300 according to another embodiment of the present invention includes an organic light emitting display panel 310 and a touch panel 320.

The organic light emitting display panel 310 includes a substrate 101, an organic light emitting unit 102 disposed on the substrate 101, a sealing substrate 103 sealing the organic light emitting unit 102, and an adhesive member 104 attached to both the substrate 101 and the sealing substrate 103.

The touch panel 320 includes a first film 321, a second film 322, and spacers 308. An interval between the first film 321 and the second film 322 is maintained by the spacers 308.

The spacers 308 are disposed on the first film 321 so as to prevent the first film 321 from coming in contact with the second film 322.

The first film 321 is disposed on the sealing substrate 103 and includes a first polarizer 309 and a fifth transparent conductive layer 305. The second film 322 includes a sixth transparent conductive layer 306 and a second polarizer 307. The fifth and sixth transparent conductive layers 305 and 306 may be formed of a transparent material such as ITO.

The first film 321 functions as a lower resistive layer of the touch panel 320, and the second film 322 functions as an upper resistive layer of the touch panel 320.

The first polarizer 309 is formed of a retardation film, and the second polarizer 307 is formed of a linear polarizer. In the embodiment of the present invention illustrated in FIG. 5, since the touch panel 320 has a polarization function, the organic light emitting display device 300 does not need to include an additional polarizing film. Thus, the entire thickness of the organic light emitting display device 300, as well as the thickness of the touch panel 320, may be decreased.

According to an organic light emitting display device of the present invention, a touch panel has a polarizing function, and thus the thickness of the organic light emitting display device can be decreased.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display device comprising:
a substrate;
an organic light emitting unit on the substrate;
a sealing substrate sealing the organic light emitting unit; and
a touch panel on the sealing substrate, and configured for polarizing light,
wherein the touch panel comprises a first film on the sealing substrate and a second film spaced from the first film, the sealing substrate being between the substrate and the first film.

2. The organic light emitting display device of claim 1, wherein the first film comprises a first transparent conductive layer, and the second film comprises a polarizing plate spaced from the first film and a second transparent conductive layer on a side of the polarizing plate facing the first film.

3. The organic light emitting display device of claim 2, wherein the first transparent conductive layer and the second transparent conductive layer each comprise indium tin oxide (ITO).

4. The organic light emitting display device of claim 2, wherein the first transparent conductive layer and the sealing substrate form a lower resistive layer of the touch panel, and the second film forms an upper resistive layer of the touch panel.

5. The organic light emitting display device of claim 1, wherein the first film comprises a transparent insulating layer and a third transparent conductive layer, which are stacked on the sealing substrate, and the second film comprises a polarizing plate, spaced from the third transparent conductive layer, and a fourth transparent conductive layer on a side of the polarizing plate facing the first film.

6. The organic light emitting display device of claim 5, wherein the third transparent conductive layer and the fourth transparent conductive layer each comprise indium tin oxide (ITO).

7. The organic light emitting display device of claim 5, wherein the polarizing plate comprises a retardation film, an adhesive layer, and a linear polarizer, which are stacked on the fourth transparent conductive layer.

8. The organic light emitting display device of claim 5, wherein the third transparent conductive layer and the transparent insulating layer form a lower resistive layer of the touch panel, and the fourth transparent conductive layer and the polarizing plate form an upper resistive layer of the touch panel.

9. The organic light emitting display device of claim 1, wherein the first film comprises a first polarizer and a fifth transparent conductive layer which are sequentially stacked on the sealing substrate, and the second film comprises a second polarizer, spaced from the fifth transparent conductive layer, and a sixth transparent conductive layer on a side of the second polarizer facing the first film.

10. The organic light emitting display device of claim 9, wherein the fifth transparent conductive layer and the sixth transparent conductive layer each comprise indium tin oxide (ITO).

11. The organic light emitting display device of claim 9, wherein the first polarizer comprises a retardation film, and the second polarizer comprises a linear polarizer.

12. The organic light emitting display device of claim 9, wherein the fifth transparent conductive layer and the first polarizer form a lower resistive layer of the touch panel, and the sixth transparent conductive layer and the second polarizer form an upper resistive layer of the touch panel.

13. The organic light emitting display device of claim 1, further comprising a plurality of spacers maintaining an interval between the first film and the second film.

14. The organic light emitting display device of claim 1, wherein the first film comprises a first transparent conductive layer formed directly on the sealing substrate.

15. An organic light emitting display device comprising:
a substrate;
an organic light emitting unit on the substrate;
a sealing substrate sealing the organic light emitting unit; and
a touch panel on the sealing substrate, and configured for polarizing light,
wherein the touch panel comprises a first film on the sealing substrate and a second film spaced from the first film,
wherein the first film comprises a first transparent conductive layer, and the second film comprises a polarizing plate spaced from the first film and a second transparent conductive layer on a side of the polarizing plate facing the first film, and
wherein the polarizing plate comprises a retardation film, an adhesive layer, and a linear polarizer, which are sequentially stacked on the second transparent conductive layer.

* * * * *